L. TRUDEAU.
Rein-Holder.
No. 208,866. Patented Oct. 8, 1878.
Fig. 1.
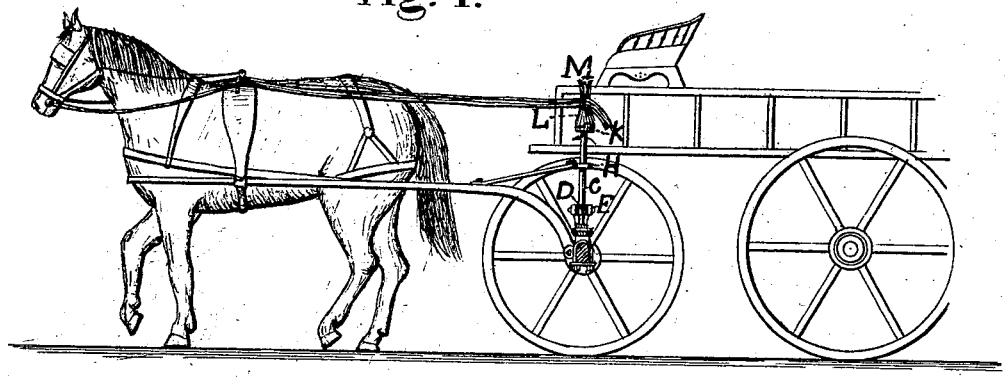
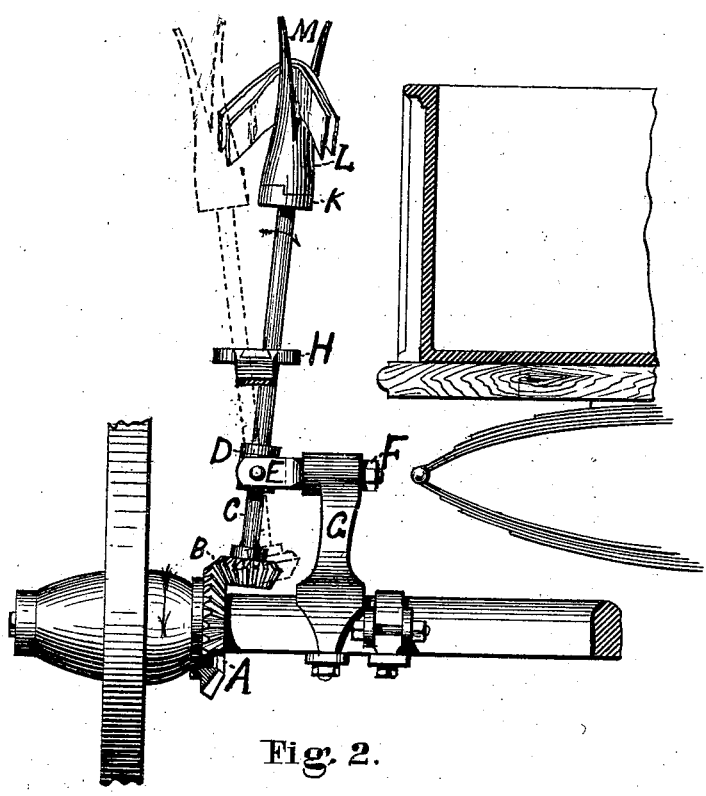
Fig. 2.
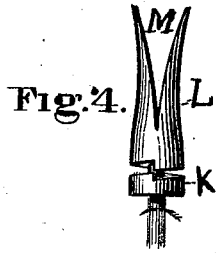
Fig. 4.
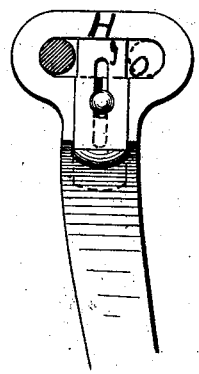
Fig. 3.
WITNESSES.
Camille Goyette
Pierre Delasalle
Joseph Masse
INVENTOR.
Louis Trudeau

UNITED STATES PATENT OFFICE.

LOUIS TRUDEAU, OF LINCOLN, RHODE ISLAND.

IMPROVEMENT IN REIN-HOLDERS.

Specification forming part of Letters Patent No. 208,866, dated October 8, 1878; application filed April 22, 1878.

*To all whom it may concern:*

Be it known that I, LOUIS TRUDEAU, of Lincoln, in the county of Providence, in the State of Rhode Island, have invented new and useful Improvements in Hitching-Machines, for securing animals attached to vehicles; and I hereby declare that the following is a full, true, clear, and exact description of the same, reference being had to the accompanying drawings, forming part of this specification.

The object of this invention is to provide a convenient means, attached to a vehicle, to secure the animal harnessed to the same from running away when the driver is absent or his attention otherwise engaged; and consists of an apparatus that acts on the reins, so that any attempt of the animal to advance brings a severe strain on the bit, which constantly increases till he stops, when, if he has advanced sufficiently to bring a painful strain on the bit, by his natural action in such a case—viz., by backing—he will relieve himself from all pressure, and can stand at ease, as will be more fully set forth hereinafter.

Figure 1 of the annexed drawing represents the device as attached to a vehicle and animal by the reins. Fig. 2 is an enlarged drawing, showing the action of the device, with the dotted lines showing the position of the device when the driver, not wishing to use it, has thrown it out of gear. Fig. 3 shows the slotted brace by which the device is kept in or out of gear, as the driver may wish. Fig. 4 shows, in detail, the clutch which winds up the reins (held in the upper part of the same) or releases them, accordingly as the animal advances or backs.

Similar letters of reference indicate corresponding parts.

In the drawings, A is a bevel-gear wheel, attached to the hub of the wheel on the side of the hub next the vehicle. B is a second bevel-gear wheel, attached to an upright shaft, (marked C,) and interlocking, when in gear, with the wheel A. The upright shaft C runs through a collar, D, working in a fork, E, at the end of a swivel, F, which works in the top of the upright support G, which is secured to the axle of the vehicle in any convenient manner, the shaft C being prevented from sliding up and down in collar D by pins, shoulders, or in any convenient manner. Above the collar D the upright shaft C passes through a slotted brace, H, (shown enlarged in Fig. 3,) which may be secured to the shaft, as shown in Fig. 1, to the bottom of the vehicle, or may be fastened to an upward extension of the upright support G, so it is held firmly in its place.

In Fig. 3, O represents the slot. I represents a key, that slides into slot O, and holds the upright shaft C either in gear, as shown by Fig. 2, if on the one side, or out of gear, as shown by dotted lines in Fig. 2, if on the other side. K and L together form a clutch, of which K is securely fixed on shaft C, while L, as shown in Fig. 4, slides up and down on upright shaft C. When the shaft C revolves in the direction shown by the arrow on shaft in Fig. 2 the piece K catches and turns piece L. When shaft C revolves in the reverse direction the piece K disengages itself and lifts up piece L, as shown in Fig. 4, when the strain of the reins causes it to unwind and leave them free. M is a receiver in the upper part of L, which may be made in any desired shape to receive the reins.

All the parts of this device may be made, in whole or in part, of any metal, or any other substance possessing sufficient strength.

The practical working of the device is as follows: If an animal be standing, as represented in Fig. 1, with the reins placed in M, and starts to go ahead, the wheel of the vehicle turns, as shown by arrow on the hub of wheel in Fig. 2, causing gear-wheel A to revolve, which, interlocking with gear-wheel B, causes that, together with shaft C, to which it is attached, to revolve in the direction shown by the arrow on the shaft, causing the piece K to catch and turn piece L, thus winding the reins around L, and bringing a constantly-increasing strain on the animal's bit till he stops. If the animal has advanced so far before stopping that the strain on the bit is disagreeable, he backs. When the wheel revolves in reverse of direction shown by the arrow, the bevel-gears A and B, the shaft C, and clutch-pieces K and L all revolve in reverse of former direction till the reins unwind, after which L will be lifted by the action of K, as shown in Fig. 4, and the horse can back as far as he pleases.

If the driver wishes to throw the apparatus out of gear, he draws back the key I from the slot O in brace H, and throws the shaft C to the other end of slot O; then putting key I back into its place, it keeps the apparatus out of gear, as shown by dotted lines in Fig. 2.

The apparatus is simple, not liable to get out of order, durable, and sightly.

Having thus described my invention, I claim as new and desire to secure by Letters Patent—

1. The combination of the bevel-gears A and B, attached substantially as above described, with the upright shaft C, secured in place and terminating in two clutch-pieces, K and L, the one fast to shaft and the other revolving loosely on the same, with a holder for reins attached to the loose pieces, substantially as above described.

2. The combination, in a hitching apparatus, of the gear-wheels A and B, shaft C, collar D, fork E, swivel F, support G, brace H, slot O, key I, clutch-pieces K and L, with rein receiver or holder M, arranged and operating as and for the purposes described.

LOUIS TRUDEAU.

Witnesses:
WELCOME A. GREEN,
FRANK A. THURBER.